Nov. 18, 1930.  S. HAMMER  1,781,686
METER ENTRANCE SWITCH BOX
Filed March 13, 1925
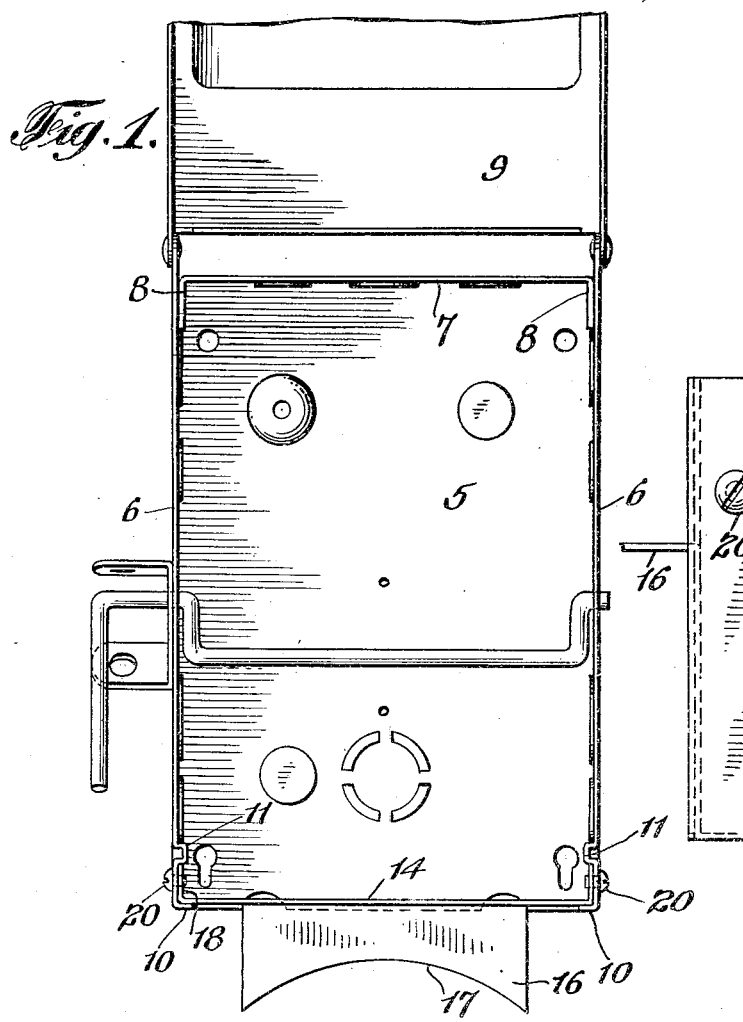
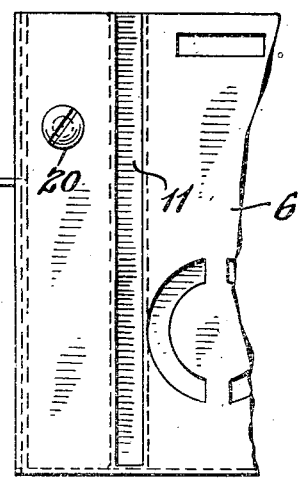
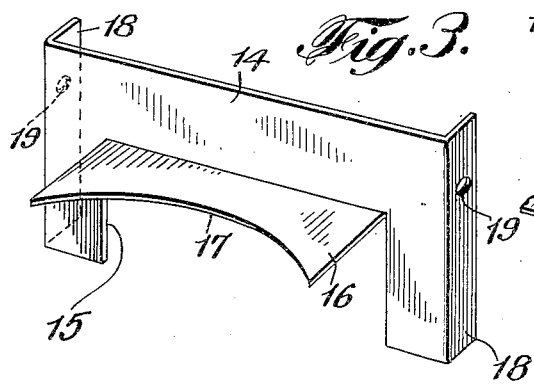
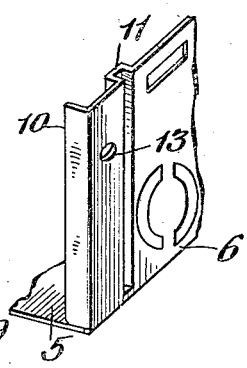
INVENTOR
Samuel Hammer,
BY C. P. Goepel
ATTORNEY Patented Nov. 18, 1930

1,781,686

UNITED STATES PATENT OFFICE

SAMUEL HAMMER, OF BROOKLYN, NEW YORK

METER-ENTRANCE SWITCH BOX

Application filed March 13, 1925. Serial No. 15,423.

This invention relates to meter entrance switch boxes. In the installation of electric meters, it is common practice in the art to mount the box or casing containing the switch mechanism controlling the supply of current through the meter to the lighting circuit of a building directly above the meter in closely juxtaposed relation therewith. Various types of such electric meters are employed having casings or housings of different external form or shape, and therefore, it has been proposed to provide the switch box with a removable lower end wall and to provide interchangeable end walls of different forms so that the switch box may be mounted and associated with the different types of meter casings.

Heretofore the side walls of the switch box and the interchangeable adapter end walls have been provided with yieldable coacting means so that the adapter wall may be snapped in place. My present invention relates particularly to an improved construction of the body walls of the box and the adapter wall whereby the insertion or removal of the latter may be very easily and quickly effected, said construction being of such a character that when said adapter wall is inserted, it is very rigidly held in connection with the side walls of the box. My new construction also obviates the possibility of distortion from proper position of the parts of the side walls of the box with which the adapter wall coacts, as may occur for instance, in structures wherein said side walls are provided with yieldable holding sections for the adapter wall.

It is also a further general object of my invention to provide a meter entrance switch box as above characterized which may be inexpensively produced by means of relatively simple metal stamping operations and which will possess maximum durability and also provide a substantially dust-tight enclosure for the switch mechanism contained within the box.

With the above and other objects in view, the invention consists in the improved meter entrance switch box, and in the form, construction and relative arrangement of its several parts as will be hereinafter more fully described, illustrated in the accompanying drawings and subsequently incorporated in the subjoined claim.

In the drawings, wherein I have illustrated one simple and practical embodiment of my present improvements, and wherein similar reference characters designate similar parts throughout the several views,—

Figure 1 is a front elevation of the box with the cover in open position and the switch mechanism removed;

Fig. 2 is a fragmentary side elevation;

Fig. 3 is a detail perspective view of the adapter and wall, and

Fig. 4 is a fragmentary perspective view of one of the side walls of the box.

Referring in detail to the drawings, the body of the switch box which is preferably of rectangular form may be conveniently produced from a single sheet metal plate and bent to provide the bottom wall 5, longitudinal side walls 6 and an end wall 7, said end wall having inturned flanges 8 extending along the inner side of the walls 6 and preferably spot welded thereto. The walls 6 are provided with lugs or ears extending beyond the end wall 7 upon which the box cover 9 is hingedly mounted at one of its ends.

Each of the side walls 6 at its other end, is provided with an inturned flange 10 which, as clearly shown in Fig. 4, overlies the bottom wall 5 of the box and if desired, may be welded to said wall at its lower end.

Adjacent to each of the flanges 10, the wall 6 of the box is pressed inwardly to form therein an internal rib 11 of substantially rectangular form in cross section. This rib which extends in spaced parallel relation to the flange 10, preferably extends the full depth of the side wall 6. Between the flange 10 and the rib 11, each side wall has an opening 13 therein for a purpose which will presently appear.

The box is adapted to be mounted in the usual manner in vertical position above the meter upon a suitable base support or panel set into or upon the wall, the end wall 7 closing the upper end or top of the box. The lower end of the switch box is adapted to be closed by the wall 14. In the illustrated example, I have shown this wall consisting of a sheet metal plate having a recess 15 and a flange 16 extending in a plane at right angles to the plane of said plate at the inner edge of the recess, the longitudinal edge of said flange being curved as at 17 so that said flange will snugly fit around the casing or housing of the meter, a part of which may project into the recess 15. However, a series of such adapter walls will be provided, differing as to the form and arrangement of the recess 15 and flange 16 in accordance with the different types of meters with which the switch box may be used. In every case however, each adapter wall is provided at its opposite ends with the angularly disposed flanges 18, each of which has a threaded opening 19 therein.

After noting the particular type of meter, the proper adapter wall 14 is selected, and the flanges 18 thereof are moved inwardly in the channels provided in each side wall of the box between the flange 10 and rib 11 thereof. When the lower edge of said adapter wall contacts with the bottom wall 5 of the box, the openings 19 of the flanges 18 will be in registering relation with the openings 13 in the side walls 6. Short screws 20 are then inserted through the openings 13 and threaded into the openings 19 whereby the flanges 18 are held against longitudinal shifting movement in said channels. It will be apparent that by means of this construction, the adapter end wall for the switch box may be very easily and quickly inserted in place and provides a rigid and substantial connection between the side walls of the box body at its open end, preventing relative bending or distortion of these end portions of said side walls. Also as the flanges 18 on the adapter wall fits snugly between the flanges 10 and the ribs 11 on the side walls of the box, it will be apparent that said end wall is securely held against any possibility of shifting longitudinally with respect to said side walls. In this manner, I provide interchangeable adapter walls for such meter entrance switch boxes which are capable of being very easily and quickly arranged in position and are very rigidly held. By avoiding the use of relatively yieldable coacting parts on the adapter wall and the side walls of the box, the process of manufacture is much simplified and production costs reduced, and at the same time greater efficiency in the practical use of such adapter walls is secured.

In the foregoing description in connection with the accompanying drawing, I have described an embodiment of my improvements which I have found to be highly satisfactory in actual use. Nevertheless, it is to be understood that the essential features of my invention may be susceptible of embodiment in various other alternative structural forms and I therefore, reserve the privilege of resorting to all such legitimate changes in the detail parts thereof as may be fairly embodied within the spirit and scope of the invention as claimed.

I claim:

A meter entrance switch box open at one end and having opposite side walls at said open end thereof each provided with an inwardly projecting flange, each of said side walls being further provided in laterally spaced relation from said flange with an inwardly pressed rib extending substantially the entire depth of the box, said rib and the flange with the part of the box wall connecting the same forming a vertical guide channel, a meter adapter end wall for said open end of the box provided at its opposite side edges with angularly disposed flanges adapted for removable engagement in said side wall channels in contacting engagement with the base walls of said channels between the flanges and stop ribs, and means for detachably securing said adapter end wall in its applied position with respect to the side walls of the box.

In testimony that I claim the foregoing as my invention, I have signed my name hereto.

SAMUEL HAMMER.